May 11, 1937.  A. C. HOOF  2,080,314
BRAKE CONSTRUCTION
Filed March 27, 1935   2 Sheets-Sheet 1
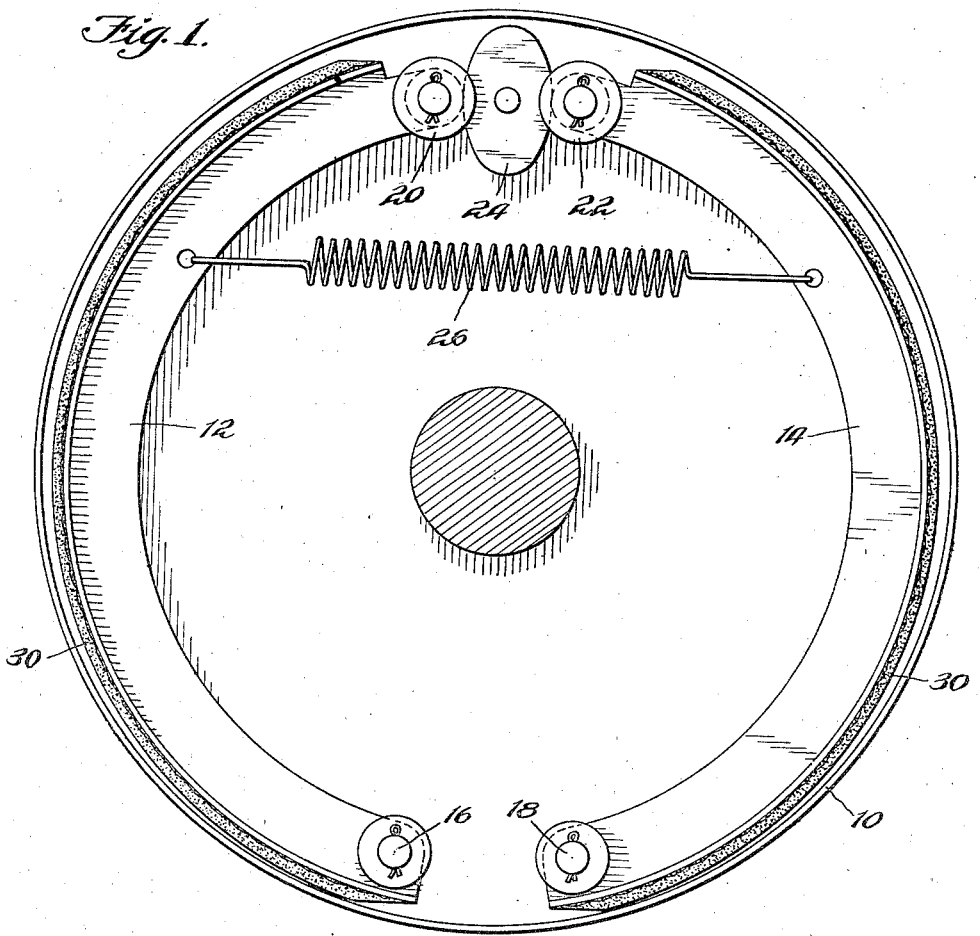
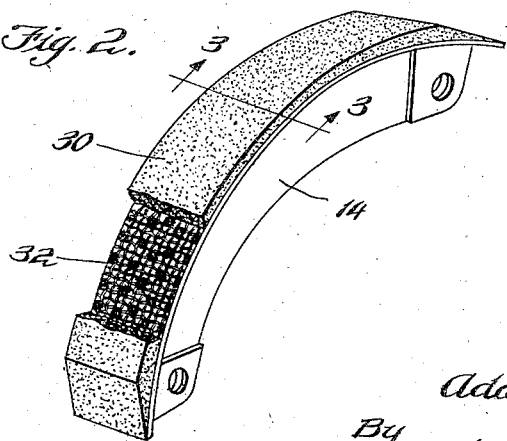
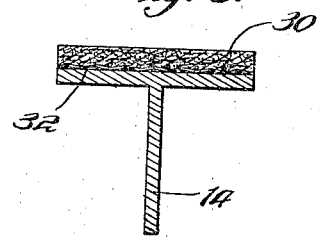
Inventor
Addison C. Hoof
By Harry H. Hitzeman
Atty.

May 11, 1937.  A. C. HOOF  2,080,314
BRAKE CONSTRUCTION
Filed March 27, 1935   2 Sheets-Sheet 2
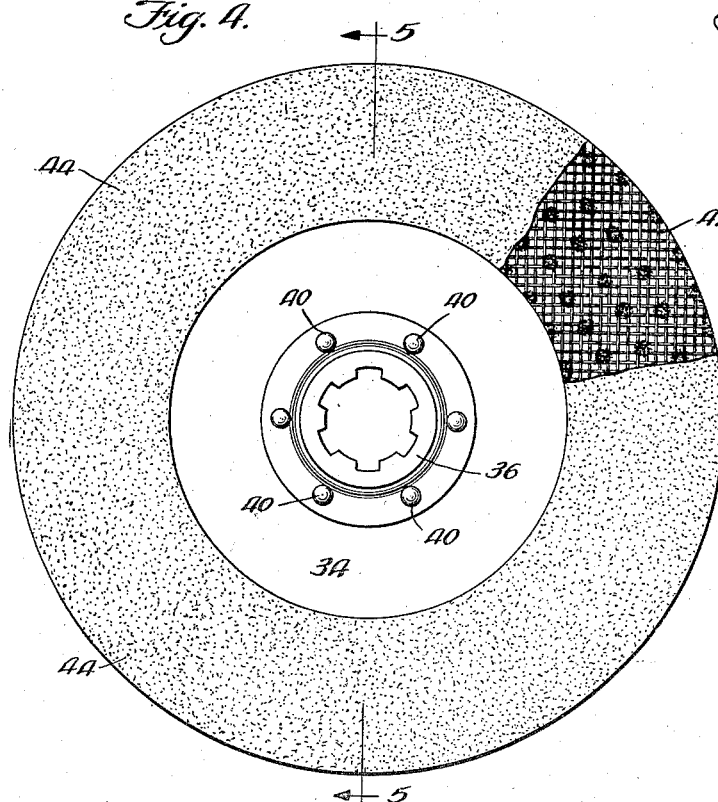
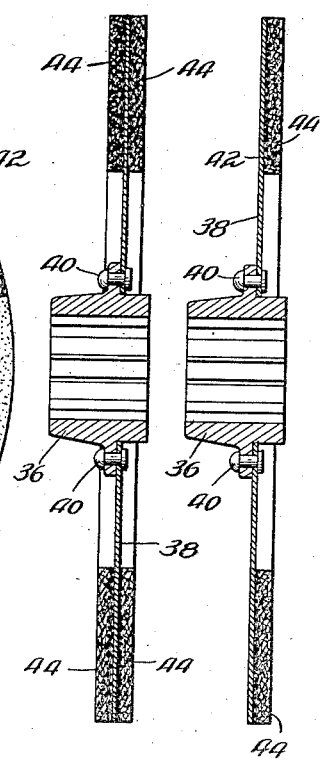
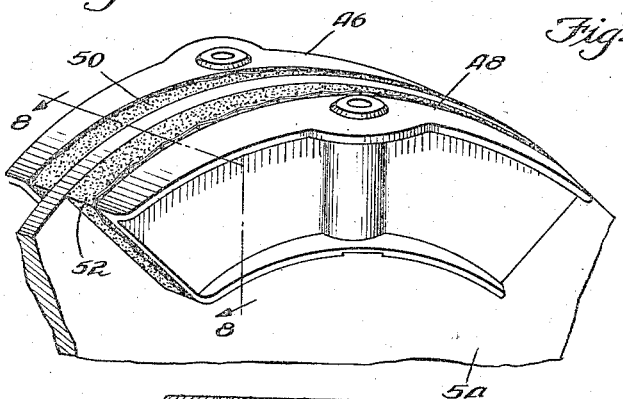
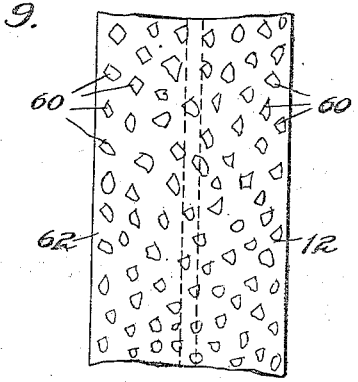
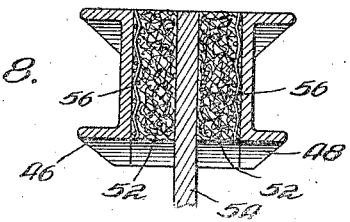
Inventor
Addison C. Hoof
By Harry H. Hitzeman
Atty.

Patented May 11, 1937

2,080,314

UNITED STATES PATENT OFFICE 2,080,314

BRAKE CONSTRUCTION

Addison C. Hoof, Hinsdale, Ill.

Application March 27, 1935, Serial No. 13,394

7 Claims. (Cl. 188—234)

My invention relates to brakes, brake linings, friction linings, clutch linings and similar materials.

My invention relates more particularly to improvements in devices of the type specified and to the class of different materials known as molded as contrasted with woven friction material, although my improvements may well be employed with woven friction material.

An object of the invention is to provide an improved composition of material which possesses a relatively high coefficient of friction and which is capable of resisting the heat tendency thereof due to the friction generated between the material and a band, disc, or other object with which it cooperates.

A further object is to provide a composition of material of the friction resisting type which will be substantially fireproof and waterproof and which will have high wear resisting qualities without lessening its frictional qualities.

A further object of the present invention is to provide a molded composition material of the type described, capable of being molded upon brake shoes, clutch discs or other objects with which it cooperates.

A further object of my invention is to provide a novel and sufficient anchorage in the brake shoe to support and hold a friction lining which has been molded upon the same.

A further object of my invention is to provide an improved holding means in connection with brakes or friction material of the class described, adapted to provide greater surface contact area on the face of the brake shoe or friction material backing so that separation of the material and the backing is impossible.

A further object is to provide an improved method of securing together molded friction material and backing members.

A further object is to provide an improved fastening between the friction material and the shoe which will prevent the braking material from "creeping", crashing or disintegrating in service.

Other objects and advantages will be more apparent from the following description wherein reference is had to the accompanying two sheets of drawings upon which I have illustrated several preferred embodiments of my invention.

In the drawings:

Fig. 1 is a front elevational view of a set of brake shoes of the conventional type used upon automobiles, equipped with my improved lining shown in place within a circular brake drum;

Fig. 2 is a view in perspective of one of the brake shoes showing the lining removed from a portion thereof;

Fig. 3 is a cross-sectional view of the shoe taken generally on the line 3—3 of Fig. 2;

Fig. 4 is an elevational view of a clutch disc to which my improved friction material has been applied;

Fig. 5 is a vertical sectional view thereof taken generally on the lines 5—5 of Fig. 4;

Fig. 6 is a similar sectional view of a modified form of clutch disc;

Fig. 7 is a perspective view illustrating my invention in association with a fragmentally illustrated rotatable disc;

Fig. 8 is a sectional view taken substantially on the lines 8—8 of Fig. 7; and

Fig. 9 is an elevational view of a modified form of brake face which may be used.

In the drawings, I have illustrated a typical automobile brake assembly which may include the brake drum 10 and a pair of brake shoe members 12 and 14 suitably mounted at their lower ends upon pivots 16 and 18. The brake shoes are provided at their upper extremities with a pair of roller members 20 and 22 normally engaging a brake operating cam 24. A spring member 26 is adapted to return the brake shoes to normal position upon releasing the brakes.

The construction thus far described is that normally shown in modern brakes. Upon the peripheral face 28 of the brake shoes 12 and 14 I provide a brake lining 30. This brake lining may be composed of inorganic material capable of being molded directly upon the shoe.

The material to which I refer and which is described in the aforesaid application is adapted to be adhered to the surface of the brake shoes during the molding and heat treating process to which the same is subjected. However, in order to secure a more perfect binder to the surface of the shoe, I have found it advisable to provide additional means for anchorage of the friction material. Accordingly, I provide a mesh screen member 32 which is adapted to be rigidly attached to the face of the brake shoe 12. This may be accomplished by welding, brazing or in any other suitable manner.

Suitable woven wire may be secured in standard widths and lengths of any small strips to the width of the brake shoe, whether it be steel or iron or any other type of material. The woven wire may preferably be of steel, but it may be any other material and may be welded to the shoe by either the resistance method or by spot-welding, or by arc welding.

In applying this wire with the resistance process the wire is taken off the roll and fed in strips into the roll machine, and through the resistance roll contacts this wire mesh will be welded in from 10 to 100 places on the shoe. It will be understood, however, that the other methods of welding which I have mentioned are all equally satisfactory for the purpose desired. ¼" mesh or ⅛" wire mesh seems to be the preferable size, as stock wire of this size is very easily obtained. However, any desirable mesh up to one inch or more may be used. The only difference would be the number of contacts which would be welded to the shoe.

After the shoe has had the wire mesh welded or otherwise secured thereto the shoe is placed in a die and a strip of brake lining material such as I have mentioned in an uncured state is placed over the shoe and is hydraulically pressed and cured in the die.

While the brake material which I have mentioned includes an inorganic binder which will adhere to the shoe, it can be seen that by hydraulically pressing any suitable brake material upon the shoe in the manner explained, it would not be necessary to use the inorganic binder for brake material which includes the same. However, this method of securing the lining to the shoe is very effective in connection with the molded brake material, as it provides additional security against an improperly cured or treated material, since it is absolutely essential in brakes that the lining be firmly fixed to the shoe.

In Figures 4, 5, and 6 I have illustrated the use of my improved anchoring means in connection with the form of clutch disc 34. This may be of the usual type comprising the hub member 36 and disc member 38 suitably fastened together by rivets 40. Upon the surface of the disc 38 I anchor a suitable wire mesh member 42. This wire mesh may preferably be fastened by welding as hereinbefore described in connection with brake shoes. The friction material 44 in its uncured form is then applied over the area covered by the wire mesh and suitably pressed into place in a die as hereinbefore described.

In the drawings I have shown two forms of clutch, the one shown in Figure 5 with clutch facings upon both sides, and in Figure 6 with clutch facing only upon one side.

In Figures 7 and 8 I have illustrated a modified form of the invention in which I have shown the segmental brake shoes 46 and 48 provided with the linings 50 and 52 upon opposed faces thereon. These segmental shoes may be suitably manipulated by well known mechanism to have a braking action upon a disc brake 54. The brake shoe and lining are secured in a manner which I have previously described, and in this modification the wire mesh 56 is also shown welded to the faces of the brake shoes 46 and 48.

In Figure 9 I have shown a face view of one of the brake shoes 12 or 14, with a plurality of a small irregularly shaped piece of metal 60 spot-welded upon the face 62 of the brake shoe. The small fragments of metal 60 are adapted to function similar to the screen member 32 and serve to securely anchor the lining 30 upon the shoe when the same is placed thereon under hydraulic pressure and cured.

From the foregoing description it will be obvious that many and varied uses may be found for the invention herein set forth. It is immaterial whether the support for the lining is in the form of a brake shoe, clutch disc, segmental brake shoe, or in any other form. The generic idea which has been worked out in this instance is believed to be adhering of a lining, either molded or woven, upon a reticulated surface, and by the pressure and chemical action of a binder during the curing operation securely fasten the lining upon the support.

I do not wish to be limited in any particular by the disclosure herein. What I desire to secure and protect by Letters Patent of the United States is:

1. In a friction member the combination of a support, a wire mesh backing member spot-welded thereto in many places throughout its length and width, and a composition body anchored thereon by being enmeshed therein and completely covering said wire mesh.

2. In a braking member the combination of a support, a wire mesh backing member spot-welded to a face thereof in many places throughout its length and width, and a composition body anchored thereon by being enmeshed therein and completely covering said wire mesh to form an integral unit.

3. That method of manufacturing a braking member which comprises fastening a wire mesh to the face of a brake shoe in many places throughout its length and width, and molding a friction lining upon said face under pressure, said lining being pressed over said wire mesh during said molding process and completely covering said wire mesh.

4. That method of manufacturing a braking member which comprises fastening a wire mesh to the face of a brake shoe by spot welding in many places throughout its length and width, and molding a friction lining upon said face under pressure so that said wire mesh is pressed into said lining, thereby anchoring the same on said shoe completely covering said wire mesh.

5. A braking member having a wire mesh member secured to a face thereof in many places throughout its length and width, a friction lining molded thereon and completely covering said wire mesh, said lining being pressed over said wire mesh during the molding process.

6. In a clutch member forming an integral unit, the combination of a support, a wire mesh backing member spot welded thereto in many places throughout its surface and a composition body anchored thereon by being enmeshed therein and completely covering said wire mesh.

7. That method of manufacturing a braking member which comprises fastening a wire mesh to the face of a brake shoe by spot welding in many places throughout its length and width, molding a friction lining upon said face under pressure so that said wire mesh is pressed into said lining, thereby anchoring the same on said shoe and curing said friction lining in a molding die during the molding process.

ADDISON C. HOOF.